A. SACK.
NUT LOCK.
APPLICATION FILED JULY 1, 1918.

1,302,858.  Patented May 6, 1919.

INVENTOR
Abel Sack.
BY
HIS ATTORNEY

UNITED STATES PATENT OFFICE.

ABEL SACK, OF GLENDIVE, MONTANA.

NUT-LOCK.

1,302,858.    Specification of Letters Patent.    Patented May 6, 1919.

Application filed July 1, 1918. Serial No. 242,775.

*To all whom it may concern:*

Be it known that I, ABEL SACK, a citizen of the United States, residing at Glendive, county of Dawson, and State of Montana, have invented certain new and useful Improvements in Nut-Locks, of which the following is a specification.

This invention relates to improvements in nut locks and has as its special object the provision of means whereby a nut is prevented from unscrewing or unloosening from the bolt or part with which it is engaged.

A further object is to provide a nut lock, inexpensive in construction and which may be readily applied without changes in the bolt and in which the nut is not changed in its appearance.

These and other like objects are attained by the novel construction and combination of parts hereinafter described and shown in the accompanying drawing, forming a material part of this specification and in which:—

Figure 1:
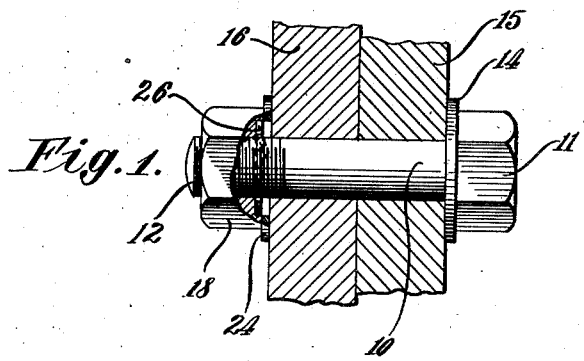
Figure 1 is a side elevational view, showing the application of the invention, parts being broken away in order to disclose the construction.
Figure 2:
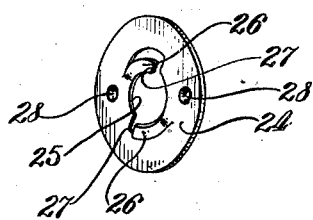
Fig. 2 is a perspective view, showing the lock washer.
Figure 3:
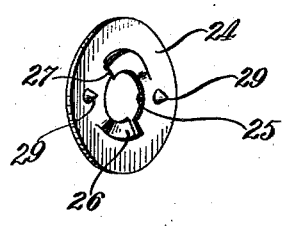
Fig. 3 is a similar perspective view of the other side of the washer.

In Fig. 1, an ordinary form of bolt is shown with a plain round stem or shank 10 adjacent to the head 11, the other end 12 of the bolt being screw-threaded in the ordinary manner.

A washer 14 may be used between the bolt head and the parts to be clamped, designated by the numerals 15 and 16 respectively, the bolt being fitted with a nut 18, containing an annular recess 20 in the base 19, concentric with the threaded opening 21.

A flat circular washer 24 is used on the bolt below the nut, the washer having a central opening 25, and integral with the washer is a pair of opposed prongs 26 formed by piercing and pressing the metal so that one end of the prongs are left attached to the material from which the washer is made.

These prongs are formed with sharply defined angular edges 27, bent outwardly from the same side of the washers and so shaped as to be received within the recess 20 of the nut, contacting against the bottom of the recess and offering material resistance against its unscrewing.

In order to prevent the washers themselves from turning with respect to the parts with which the are engaged, indentations 28 are made on one side, these indentations forming sharply pointed spurs 29 on the other side of the washer, adapted to engage with the parts clamped by the nut, so as to retain the washer against rotation.

Figure 4:
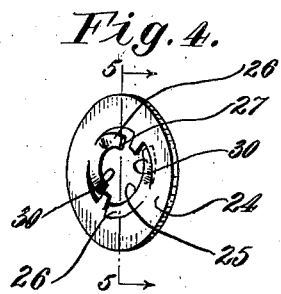
Fig. 4 is a perspective view showing a modified form of lock washer.
Figure 5:
Fig. 5 is a sectional view, taken on line 5—5 of Fig. 4.
Figure 6:
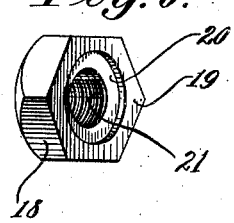
Fig. 6 is a perspective view, showing an ordinary nut having a recess, in its bottom.

In the modified form shown in Figs. 4 and 5, in addition to the prongs 26, another pair of opposed prongs 30 are pressed outwardly from the washer, taking the place of the spurs 29, formed by the indentation 28, and it will be obvious that two of the washers may be placed side by side in alinement so that should the spurs become worn, broken, or otherwise damaged, the washers may be reversed in position, practically renewing the sharp edges which make contact with the nut and part to be clamped respectively.

Figure 7:
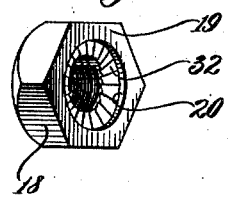
Fig. 7 is a similar perspective view, showing the inner surface of the recess, formed with ratchet like teeth.

Fig. 7, shows a modified nut containing a plurality of ratchet shaped teeth 32, with which the prongs 26 are directly engageable, thereby positively preventing the nut from turning relatively to the washer.

It is to be understood that the material of the washer is of a resilient nature and yet capable of maintaining the prongs extended rigidly outward, so as to act in an effective manner.

The construction and operation of the device is believed to be evident from the foregoing, taken in connection with the drawing, while its use and application is of an obvious nature.

Having thus described my invention what I claim as new, and desire to secure by Letters Patent is:—

In a nut lock, the combination with a threaded bolt and a nut suited thereto, of circular washers fitted to the shank of said bolt, a pair of opposed prongs having sharply defined edges bent outwardly from the same side of the washers the center parts of said prongs being integral with said washers, and a pair of said washers placed side by side and in alinement, and a second pair of opposed prongs also pressed outwardly from the washers, one pair of said prongs being adapted to engage with the part to be clamped on one side, an annular recess formed in the base of said nut, and ratchet teeth formed in the bottom of said recess engageable with the other pair of prongs formed with said washer.

In testimony whereof I have affixed my signature.

ABEL SACK.